(12) United States Patent
Yeskel et al.

(10) Patent No.: US 9,294,522 B1
(45) Date of Patent: Mar. 22, 2016

(54) SYNCHRONOUS COMMUNICATION SYSTEM AND METHOD

(71) Applicant: Google Inc., Mountain View, CA (US)

(72) Inventors: Zachary Yeskel, San Francisco, CA (US); David Scrymgeour Bennett, Issaquah, WA (US); Kathryn Cushing, San Francisco, CA (US); Dave Cohen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 182 days.

(21) Appl. No.: 13/730,499

(22) Filed: Dec. 28, 2012

(51) Int. Cl.
    *G06F 15/16* (2006.01)
    *H04L 29/06* (2006.01)

(52) U.S. Cl.
    CPC .................................. *H04L 65/403* (2013.01)

(58) Field of Classification Search
    None
    See application file for complete search history.

(56) References Cited

U.S. PATENT DOCUMENTS

| | | | |
|---|---|---|---|
| 7,801,971 B1 | 9/2010 | Amidon et al. | |
| 8,069,142 B2 * | 11/2011 | Davis et al. | 707/610 |
| 8,281,027 B2 * | 10/2012 | Martinez et al. | 709/231 |
| 8,402,094 B2 | 3/2013 | Bosworth et al. | |
| 8,452,855 B2 * | 5/2013 | Higgins et al. | 709/219 |
| 8,489,442 B1 * | 7/2013 | Mohler | 705/7.13 |
| 8,527,287 B1 * | 9/2013 | Bhatia | 705/1.1 |
| 8,769,012 B1 | 7/2014 | Shah et al. | |
| 8,781,841 B1 * | 7/2014 | Wang | 704/275 |
| 2002/0075303 A1 * | 6/2002 | Thompson et al. | 345/751 |
| 2002/0075304 A1 * | 6/2002 | Thompson et al. | 345/751 |
| 2005/0216848 A1 * | 9/2005 | Thompson et al. | 715/753 |
| 2005/0289471 A1 * | 12/2005 | Thompson et al. | 715/751 |
| 2006/0117264 A1 * | 6/2006 | Beaton et al. | 715/751 |
| 2007/0192410 A1 * | 8/2007 | Liversidge et al. | 709/204 |
| 2009/0106040 A1 * | 4/2009 | Jones | 705/1 |
| 2009/0119603 A1 * | 5/2009 | Stackpole | 715/753 |
| 2010/0138492 A1 * | 6/2010 | Guzman et al. | 709/204 |
| 2010/0205541 A1 | 8/2010 | Rapaport et al. | |
| 2010/0238919 A1 * | 9/2010 | Froelich | 370/352 |
| 2011/0010641 A1 * | 1/2011 | Wolff et al. | 715/753 |
| 2011/0161987 A1 | 6/2011 | Huang et al. | |
| 2011/0208822 A1 * | 8/2011 | Rathod | 709/206 |
| 2011/0288884 A1 * | 11/2011 | Algoo et al. | 705/3 |
| 2011/0289156 A1 * | 11/2011 | Pirnazar | 709/206 |
| 2011/0289157 A1 * | 11/2011 | Pirnazar | 709/206 |
| 2011/0296506 A1 * | 12/2011 | Caspi | 726/6 |
| 2011/0302105 A1 | 12/2011 | Yakubov | |
| 2012/0030193 A1 | 2/2012 | Richberg et al. | |
| 2012/0089470 A1 * | 4/2012 | Barnes, Jr. | 705/16 |
| 2012/0096490 A1 * | 4/2012 | Barnes, Jr. | 725/34 |

(Continued)

OTHER PUBLICATIONS

Examination Report dated Nov. 14, 2014 for Australian App. No. 2013205057.

(Continued)

*Primary Examiner* — Ranodhi Serrao
(74) *Attorney, Agent, or Firm* — IP Spring (57) ABSTRACT

A method and computing system for providing, using one or more computing devices, a plurality of users of a social network with the ability to schedule a topic-specific, synchronous communication session to occur at a future time. An indication is received, from a first user of the plurality of users, to schedule the topic-specific, synchronous communication session to occur at a future time. Electronic invitations are provided concerning the topic-specific, synchronous communication session, using the one or more computing devices, to one or more invited users chosen from the plurality of users of the social network.

21 Claims, 5 Drawing Sheets

(56) References Cited

U.S. PATENT DOCUMENTS

| | | |
|---|---|---|
| 2012/0110085 A1 | 5/2012 | Malik et al. |
| 2012/0117153 A1* | 5/2012 | Gunasekar et al. ........... 709/204 |
| 2012/0166532 A1 | 6/2012 | Juan et al. |
| 2012/0179980 A1* | 7/2012 | Whalin et al. ................ 715/753 |
| 2012/0188330 A1* | 7/2012 | Turner ....................... 348/14.08 |
| 2012/0233548 A1* | 9/2012 | Zinn .......................... 715/733 |
| 2012/0275583 A1* | 11/2012 | Katis et al. ................. 379/88.22 |
| 2012/0288074 A1* | 11/2012 | Katis et al. ................. 379/93.01 |
| 2012/0290950 A1* | 11/2012 | Rapaport et al. .............. 715/753 |
| 2013/0124322 A1 | 5/2013 | Boland et al. |
| 2013/0143539 A1* | 6/2013 | Baccay et al. ................ 455/416 |
| 2013/0159110 A1 | 6/2013 | Rajaram et al. |
| 2013/0176895 A1* | 7/2013 | McEachern et al. .......... 370/254 |
| 2013/0179518 A1* | 7/2013 | Quan ........................... 709/206 |
| 2013/0211868 A1* | 8/2013 | DeLuca ....................... 705/7.19 |
| 2013/0218982 A1* | 8/2013 | Hymel et al. ................. 709/206 |
| 2013/0329865 A1* | 12/2013 | Ristock et al. ............. 379/88.01 |
| 2014/0172967 A1* | 6/2014 | Yeung et al. .................. 709/204 |

OTHER PUBLICATIONS

International Preliminary Report on Patentability and Written Opinion mailed Oct. 2, 2014 for Application No. PCT/US2013/033438.

International Search Report and Written Opinion mailed Jun. 28, 2013 for Application No. PCT/US2013/033438.

Non-Final Rejection dated Jun. 11, 2015 in U.S. Appl. No. 13/427,125.

\* cited by examiner

SYNCHRONOUS COMMUNICATION SYSTEM AND METHOD

TECHNICAL FIELD

This disclosure relates to topic-specific, synchronous communication sessions and, more particularly, to the scheduling of topic-specific, synchronous communication sessions.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

As is known in the art, the phrase social network may be used to refer to a group of technologies (e.g. Web-based and mobile technologies) that allow for users to engage in a quasi-real-time, interactive dialogue. Social networking websites have allowed people to interact and socialize in ways that were unimaginable ten years ago. For example, the use of such social networking websites has allowed for long lost friends to be reunited, long-distance friendships to be easily maintained, and information to be broadcast to groups of people.

SUMMARY OF DISCLOSURE

In a first implementation, a computer-implemented method includes providing, using one or more computing devices, a plurality of users of a social network with the ability to schedule a topic-specific, synchronous communication session to occur at a future time. An indication is received, from a first user of the plurality of users, to schedule the topic-specific, synchronous communication session to occur at a future time. Electronic invitations are provided concerning the topic-specific, synchronous communication session, using the one or more computing devices, to one or more invited users chosen from the plurality of users of the social network. An RSVP notification is received, from at least one of the invited users, in response to the electronic invitation concerning the topic-specific, synchronous communication session. The topic-specific, synchronous communication session is provided, using the one or more computing devices, for the first user and the at least one of the invited users.

In another implementation, a computer-implemented method includes providing, using one or more computing devices, a plurality of users of a social network with the ability to schedule a topic-specific, synchronous communication session to occur at a future time. An indication is received, from a first user of the plurality of users, to schedule the topic-specific, synchronous communication session to occur at a future time. Electronic invitations are provided concerning the topic-specific, synchronous communication session, using the one or more computing devices, to one or more invited users chosen from the plurality of users of the social network.

One or more of the following features may be included. An RSVP notification may be received, from at least one of the invited users, in response to the electronic invitation concerning the topic-specific, synchronous communication session. The topic-specific, synchronous communication session may be provided, using the one or more computing devices, for the first user and the at least one of the invited users. Providing the topic-specific, synchronous communication session for the first user and the at least one of the invited users may include rendering an audio-video stream received from one or more of the first user and the at least one of the invited users within the topic-specific, synchronous communication session. At least one of the invited users may be connected to the first user within the social network. The first user may be allowed to define a text-based comment concerning the topic-specific, synchronous communication session. Providing electronic invitations concerning the topic-specific, synchronous communication session may include providing the text-based comment to the one or more invited users. The text-based comment may be a descriptor for the topic-specific, synchronous communication session. The electronic reminders concerning the topic-specific, synchronous communication session may be provided, using the one or more computing devices, to one or more invited users chosen from the plurality of users of the social network proximate the future time. The electronic reminders may be chosen from the group consisting of: an email notification to an email inbox; a sandbar notification to a GUI; and a ping notification to a cellphone.

In another implementation, a computing system including a processor and memory is configured to perform operations including providing, using one or more computing devices, a plurality of users of a social network with the ability to schedule a topic-specific, synchronous communication session to occur at a future time. An indication is received, from a first user of the plurality of users, to schedule the topic-specific, synchronous communication session to occur at a future time. Electronic invitations are provided concerning the topic-specific, synchronous communication session, using the one or more computing devices, to one or more invited users chosen from the plurality of users of the social network.

One or more of the following features may be included. An RSVP notification may be received, from at least one of the invited users, in response to the electronic invitation concerning the topic-specific, synchronous communication session. The topic-specific, synchronous communication session may be provided, using the one or more computing devices, for the first user and the at least one of the invited users. Providing the topic-specific, synchronous communication session for the first user and the at least one of the invited users may include rendering an audio-video stream received from one or more of the first user and the at least one of the invited users within the topic-specific, synchronous communication session. At least one of the invited users may be connected to the first user within the social network. The first user may be allowed to define a text-based comment concerning the topic-specific, synchronous communication session. Providing electronic invitations concerning the topic-specific, synchronous communication session may include providing the text-based comment to the one or more invited users. The text-based comment may be a descriptor for the topic-specific, synchronous communication session. The electronic reminders concerning the topic-specific, synchronous communication session may be provided, using the one or more computing devices, to one or more invited users chosen from the plurality of users of the social network proximate the future time. The electronic reminders may be chosen from the group consisting of: an email notification to an email inbox; a sandbar notification to a GUI; and a ping notification to a cellphone.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
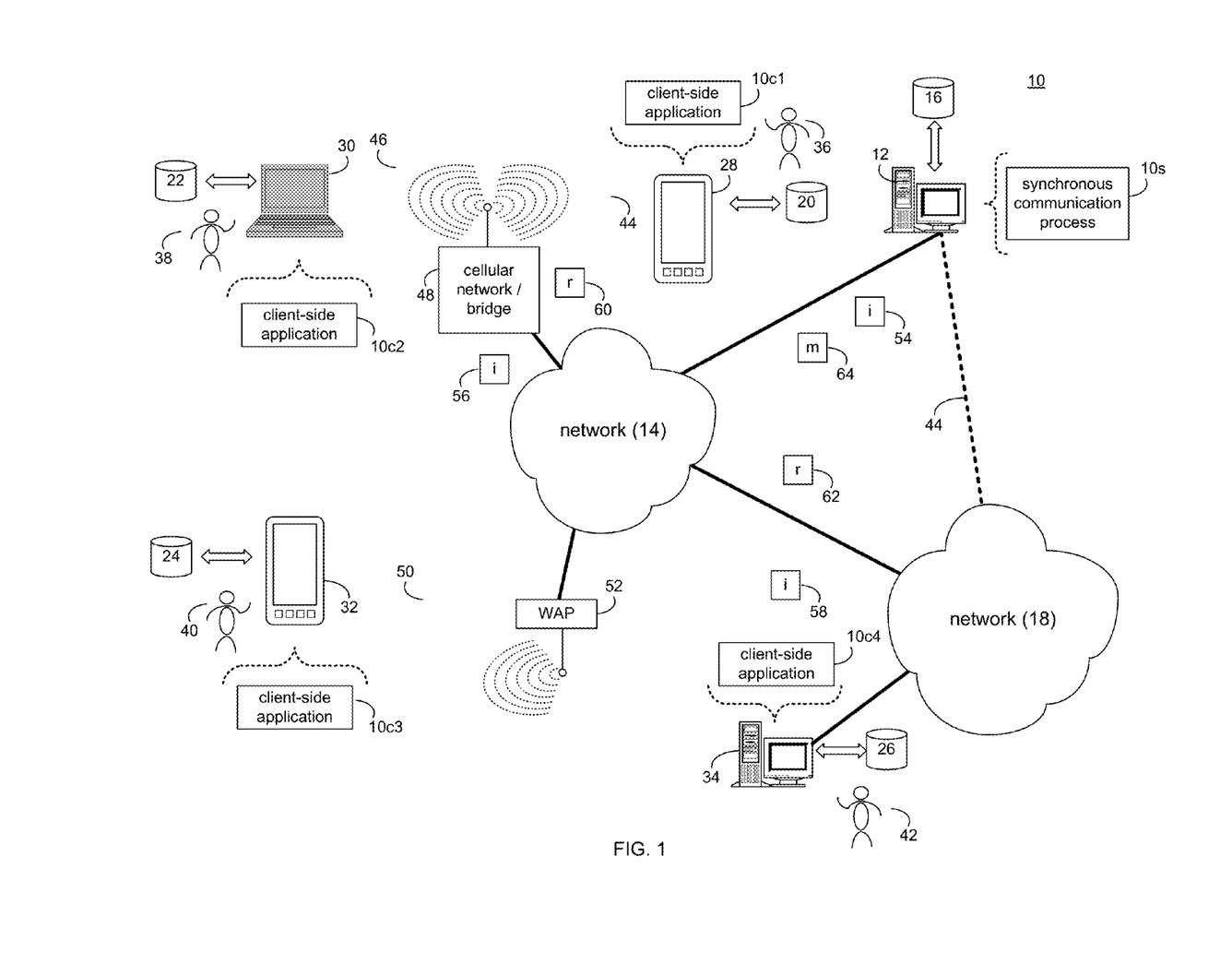
FIG. 1 is a diagrammatic view of a distributed computing network including a computing device that executes a synchronous communication process according to an embodiment of the present disclosure.
Figure 2:
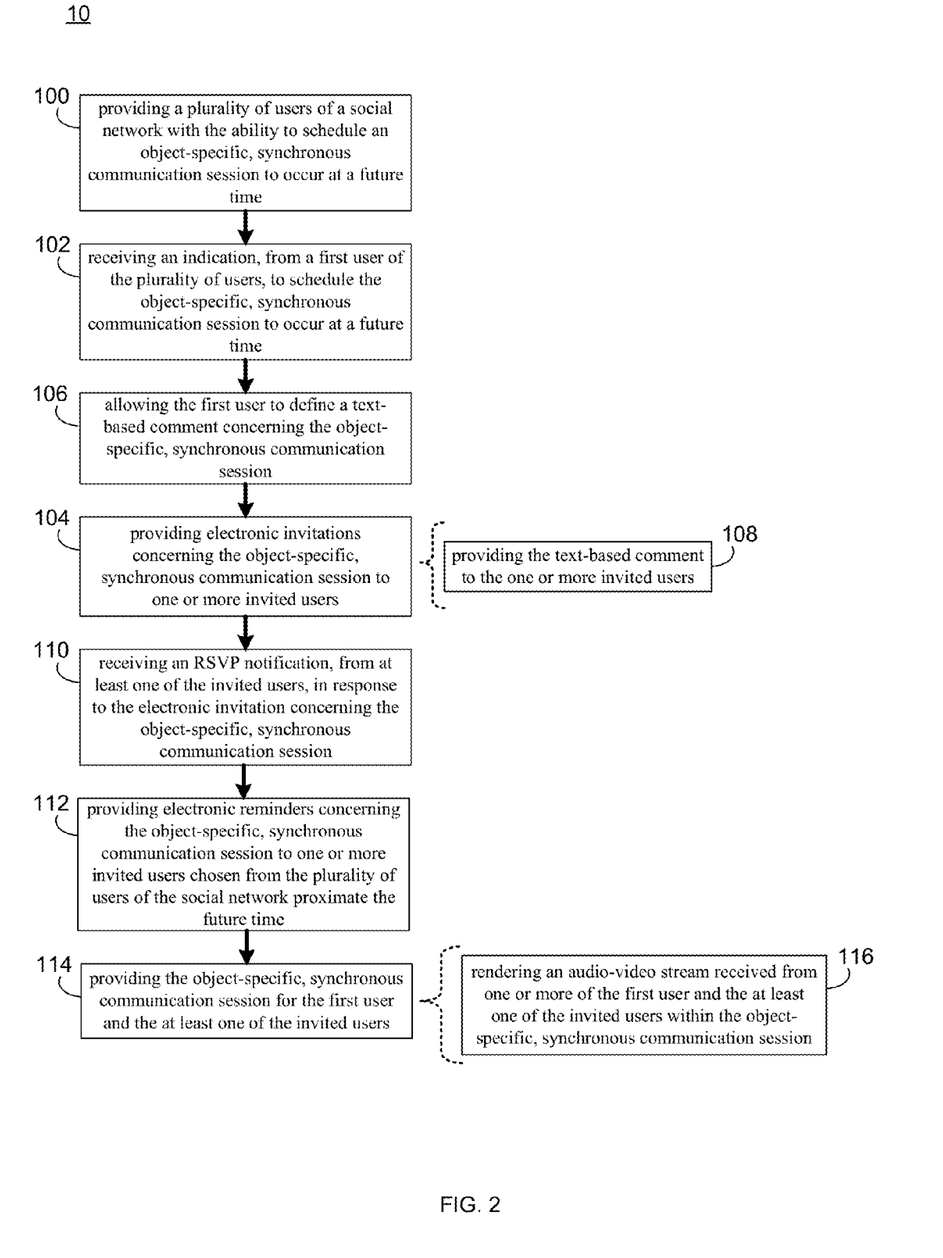
FIG. 2 is a flowchart of the synchronous communication process of FIG. 1 according to an embodiment of the present disclosure.

In FIGS. 1 & 2, there is shown synchronous communication process 10. Synchronous communication process 10 may be implemented as a server-side process, a client-side process, or a hybrid server-side/client-side process. For example, synchronous communication process 10 may be implemented as a purely server-side process via synchronous communication process 10s. Alternatively, synchronous communication process 10 may be implemented as a purely client-side process via one or more of client-side application 10c1, client-side application 10c2, client-side application 10c3, and client-side application 10c4. Alternatively still, synchronous communication process 10 may be implemented as a hybrid server-side/client-side process via synchronous communication process 10s in combination with one or more of client-side application 10c1, client-side application 10c2, client-side application 10c3, and client-side application 10c4. Accordingly, synchronous communication process 10 as used in this disclosure may include any combination of synchronous communication process 10s, client-side application 10c1, client-side application 10c2, client-side application 10c3, and client-side application 10c4.

As will be discussed below in greater detail, synchronous communication process 10 may provide 100 a plurality of users of a social network with the ability to schedule a topic-specific, synchronous communication session for occurrence sometime in the future (e.g., a week, a month, or a year from now). Synchronous communication process 10 may receive 102 an indication, from a first user of the plurality of users, to schedule the topic-specific, synchronous communication session to occur at a future time. Synchronous communication process 10 may provide 104 electronic invitations concerning the topic-specific, synchronous communication session to one or more invited users chosen from the plurality of users of the social network.

Synchronous communication process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of synchronous communication process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, or a specialized application (e.g., an application running on e.g., the Android™ platform or the iPhone™ platform). The instruction sets and subroutines of client-side applications 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access synchronous communication process 10 directly through network 14 or through secondary network 18. Further, synchronous communication process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks may be able to participate in group communication sessions. For example, Google+™ allows users of this social network to participate in "hangouts", which are multiuser video chat rooms that allow for virtual gatherings of people so that they may chat about specific topics. Synchronous communication process 10 may leverage the use of Google™ "hangouts" so that hangouts may be classified as events, thus allowing these hangouts to be scheduled to occur some time in the future within (in this example) Google+™.

While the above discussion concerns Google+™, this is for illustrative purposes only and is not intended to be a limitation of this disclosure. For example, synchronous communication process 10 may be included within or utilized by any social networking website.

Specifically and as will be discussed below in greater detail, synchronous communication process 10 may be configured to allow a user of a social network to schedule a hangout as an event that will occur some time in the future. For example, a user of the social network may schedule a hangout event to occur the day after the long-anticipated release of a hyped consumer electronic device, wherein the intent of the hangout event is to discuss the newly-released device.

Figure 3:
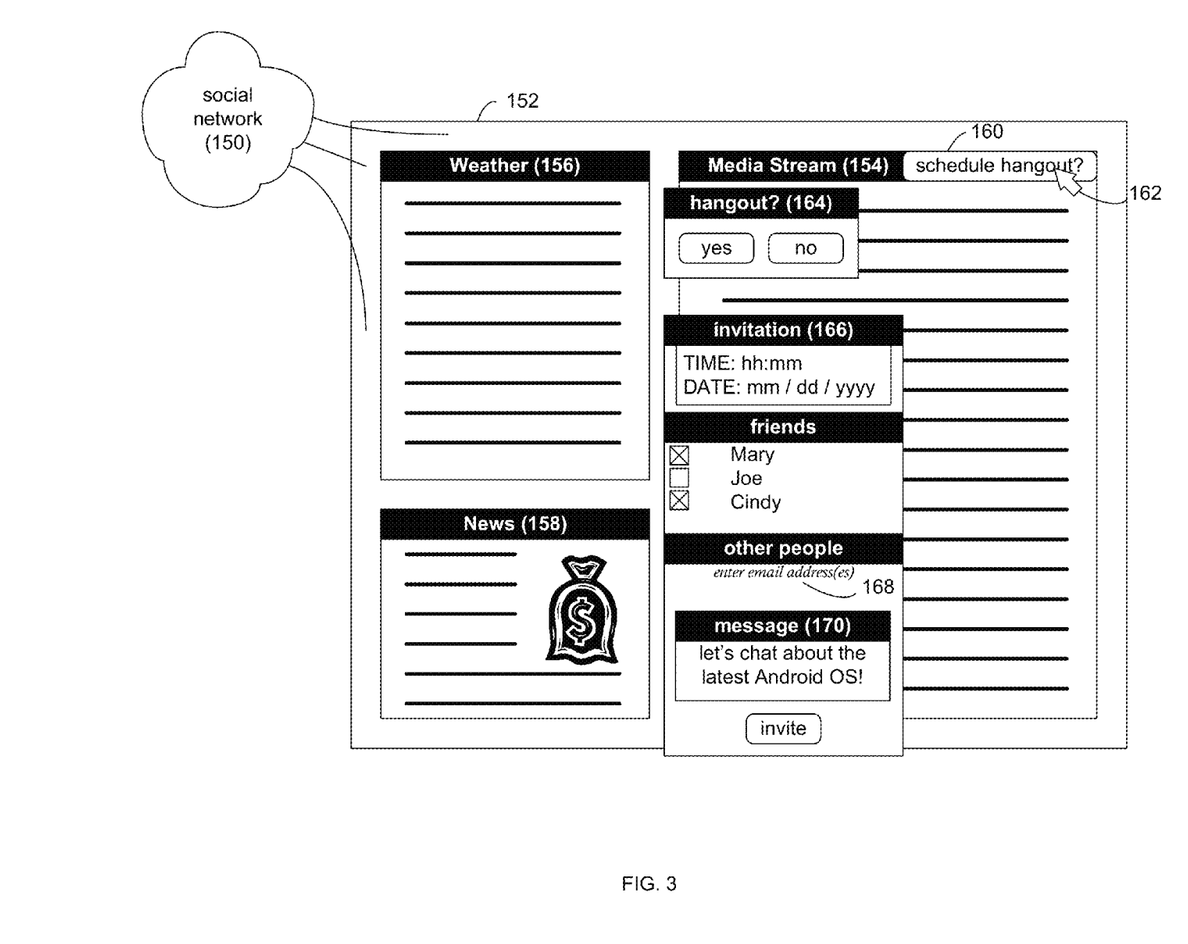
FIG. 3 is a diagrammatic view of a display screen rendered by the synchronous communication process of FIG. 1 according to an embodiment of the present disclosure.

Referring also to FIG. 3, synchronous communication process 10 may be included within, executed within, or a portion of a social network (e.g., social network 150). As discussed above, the phrase social network may be used to refer to a group of technologies (e.g. web-based and mobile technologies) that allow for users to engage in a quasi-real-time, interactive dialogue.

Assume for illustrative purposes that user 36 (i.e. Mark) is looking forward to the release of the latest Android™ operating system (which is occurring in approximately two months time). Synchronous communication process 10 may be configured to provide 100 a plurality of users (e.g., user 36, 38, 40, 42) of social network 150 with the ability to schedule a topic-specific, synchronous communication session (e.g., a hangout) to occur at a future time (e.g., approximately two months from now).

Assume for illustrative purposes that user 36 wishes to schedule a topic-specific, synchronous communication session (e.g., a hangout) to occur at a future time (e.g., some time after the release of the latest Android™ operating system). Accordingly, user 36 may select e.g., schedule hangout button 160 using onscreen pointer 162 (which is controllable via a mouse, not shown).

Upon user 36 making this selection, synchronous communication process 10 may render hangout scheduling window 164 that may allow users 36 to choose whether or not they wish to schedule a topic-specific, synchronous communication session concerning e.g., the release of the latest Android™ operating system. For example, if user 36 wishes to schedule such a topic-specific, synchronous communication session, user 36 may select the "yes" button included within hangout scheduling window 164. Alternatively, if user 36 does not wish to schedule such a topic-specific, synchronous communication session, user 36 may select the "no" button included within hangout scheduling window 164.

Figure 4:
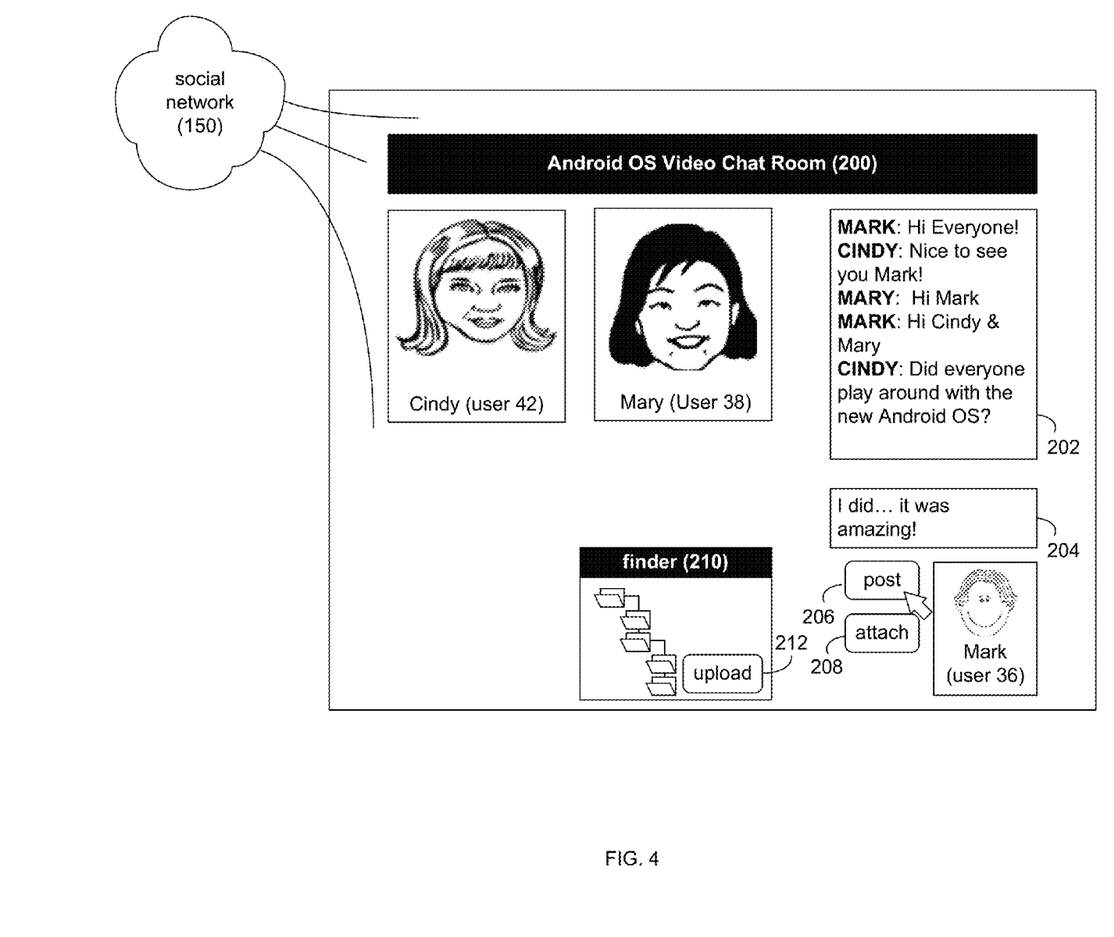
FIG. 4 is a diagrammatic view of another display screen rendered by the synchronous communication process of FIG. 1 according to an embodiment of the present disclosure.

Referring also to FIG. 4, assume for illustrative purposes that user 36 wishes to initiate such a topic-specific, synchronous communication session concerning e.g., the release of the latest Android™ operating system. Accordingly, user 36 may select the "yes" button included within hangout scheduling window 164, resulting in the generation of indication 54. Upon synchronous communication process 10 receiving 102 indication 54 from user 36 concerning the scheduling of the topic-specific, synchronous communication session (e.g., the hangout), synchronous communication process 10 may render invitation window 166 that may be configured to define a scheduled time/date and allow user 36 to identify invitee(s) for the topic-specific, synchronous communication session (e.g., the hangout).

Invitation window 166 may be configured to allow user 36 to define a time/date for topic-specific, synchronous communication session 200. As discussed above, since topic-specific, synchronous communication session 200 is being scheduled to discuss the release of the latest Android™ operating system, user 36 may schedule topic-specific, synchronous communication session 200 to occur sometime after the release date of the latest Android™ operating system. Accordingly, user 36 may enter the appropriate time and date into the TIME and DATE field of invitation window 166.

Invitation window 166 may further be configured to allow user 36 to invite various types of individuals to topic-specific, synchronous communication session 200. For example, invitation window 166 may be configured to identify members of social network 150 that are friends with/connected to/in a circle with user 36. For example, assume that user 36 is friends with Mary (user 38), Joe (user 40), and Cindy (user 42).

In the event that user 36 wishes to invite any of users 38, 40, 42 to join topic-specific, synchronous communication session 200, user 36 may check the appropriate check box next to the name of the user(s) that they wish to invite.

Additionally, invitation window 166 may be configured to allow user 36 to invite people that are not members of social network 150. Accordingly, user 36 may populate email field 168 with the email address(es) of people that that they wish to invite to join topic-specific, synchronous communication session 200 but are currently not members of social network 150.

Invitation window 166 may include message field 170 that may allow 106 user 36 to define a text-based comment concerning topic-specific, synchronous communication session 200. For example, user 36 may add the comment "let's chat about the latest Android™ OS". Accordingly, the text-based comment may be used as a descriptor for topic-specific, synchronous communication session 200.

Once the appropriate people are identified within invitation window 166 (thus defining a group of invited users), user 36 may select (via onscreen pointer 162) the "invite" button included within invitation window 166 and synchronous communication process 10 may provide 104 electronic invitations (e.g., invitations 56, 58) concerning topic-specific, synchronous communication session 200 (e.g., the hangout) to one or more invited users (e.g., users 38, 42) chosen from the plurality of users of social network 150. For example, synchronous communication process 10 may provide 104 invitations 56, 58 to users 38, 42 (respectively). When providing 104 invitations 56, 58 to users 38, 42, synchronous communication process 10 may also provide 108 the above-described text-based comment concerning topic-specific, synchronous communication session 200 within invitations 56, 58.

If the person being invited to join topic-specific, synchronous communication session 200 was not a member of social network 150, that person may first be asked to join social network 150 and, upon joining social network 150, may be allowed to participate in topic-specific, synchronous communication session 200.

While the following discussion concerns topic-specific, synchronous communication session 200 being an audio-video, topic-specific, synchronous communication session, this is for illustrative purposes only and is not intended to be a limitation of this disclosure, as other configurations are possible (e.g., a multi-user, audio-only chat room) and are considered to be within the scope of this disclosure.

Upon receiving invitations 56, 58, users 38, 42 may either accept or reject the same. Assume for illustrative purposes that each of users 38, 42 accepts their invitation to join topic-specific, synchronous communication session 200. Upon a user accepting one of the above-described invitations, a corresponding RSVP (e.g., RSVP 60, 62) may be generated concerning topic-specific, synchronous communication session 200, which may be received 110 by synchronous communication process 10.

Synchronous communication process 10 may provide 112 electronic reminders (not shown) concerning topic-specific, synchronous communication session 200 to one or more of the invited users (users 38, 42) proximate the future time (i.e., the scheduled time/date of topic-specific, synchronous communication session 200). The type of reminder sent to the invited user may vary depending on the status of the invited user. For example, if the invited user had sent an RSVP stating that they would not attend, synchronous communication process 10 may not send a reminder. If the invited user had sent an RSVP stating that they would attend, synchronous communication process 10 may send a reminder informing them that topic-specific, synchronous communication session 200 is about to begin. If the invited user had not responded to the invitation (i.e., had not RSVP'd), synchronous communication process 10 may send a reminder asking them if they are interested in participating in topic-specific, synchronous communication session 200 and/or reminding them to respond to the invitation.

Concerning the electronic reminders (not shown) provided 112 by synchronous communication process 10, these electronic reminders may be in the form of email notifications (to an inbox of the invited user); a sandbar notification (to a social network GUI of the invited user); and/or a ping notification (e.g., a text message) to a cellular phone of the invited user.

Synchronous communication process 10 may provide 114 topic-specific, synchronous communication session 200 for the user initiating topic-specific, synchronous communication session 200 (e.g., user 36) and the user(s) who accepted the invitation (users 38, 42).

As discussed above, topic-specific, synchronous communication session 200 may be an audio-video, topic-specific, synchronous communication session. Accordingly, when providing 114 topic-specific, synchronous communication session 200 to users, 36, 38, 42, synchronous communication process 10 may render 116 an audio-video stream (e.g., generated by a webcam/microphone included within client electronic devices 28, 30, 34 (respectively)) received from e.g., users 36, 38, 42 within topic-specific, synchronous communication session 200.

Once the topic-specific, synchronous communication session 200 is initiated by social network 150, users 36, 38, 42 may be permitted to participate within topic-specific, synchronous communication session 200. For example and as discussed above, users 36, 38, 42 may be allowed to provide an audio-video stream to topic-specific, synchronous communication session 200, so that the participating users may "appear" as an audio-video stream within topic-specific, synchronous communication session 200.

In addition to the above-described audio & video based communication, synchronous communication process 10 may be configured to render text-based chat window 202 within topic-specific, synchronous communication session 200, thus enabling text-based participation within topic-specific, synchronous communication session 200. For example, topic-specific, synchronous communication session 200 may be configured to allow user 36 to post a text-based message within text-based chat window 202. Accordingly, user 36 may compose their message (e.g., "I did . . . it was amazing!") within message composition window 204 and select "post" button 206, resulting in the generation of text-based message 64, which may be provided to synchronous communication process 10. Upon receiving text-based message 64 from user 36, synchronous communication process 10 may render text-based message 64 within text-based chat window 202 of topic-specific, synchronous communication session 200.

Additionally/alternatively, synchronous communication process 10 may be configured to allow user 36 to upload files (e.g., photographs, video recordings, audio recordings) that are owned by user 36 to the topic-specific, synchronous communication session 200. For example, user 36 may upload a screenshot of the Android™ OS to topic-specific, synchronous communication session 200, thus allowing user 36 to share that screenshot with e.g., users 38, 42. Accordingly, user 36 may select "attach" button 208, which may render finder window 210 that may allow user 36 to select the appropriate file for upload. Once the appropriate file is selected, user 36 may select "upload" button 212, resulting in the selected file being uploaded by synchronous communication process 10 and made available within topic-specific, synchronous communication session 200.

Synchronous communication process 10 may be configured to allow the various users of social network 150 to opt in/out of the various aspects of topic-specific, synchronous communication session 200. For example, synchronous communication process 10 may be configured so that a user cannot be invited to join topic-specific, synchronous communication session 200 unless e.g., they proactively choose to allow all invitations or they are connected to the inviting user. Additionally, a user of social network 150 may configure synchronous communication process 10 so that the above-described service (i.e., being able to schedule topic-specific, synchronous communication session 200) is not provided to the user.

Figure 5:
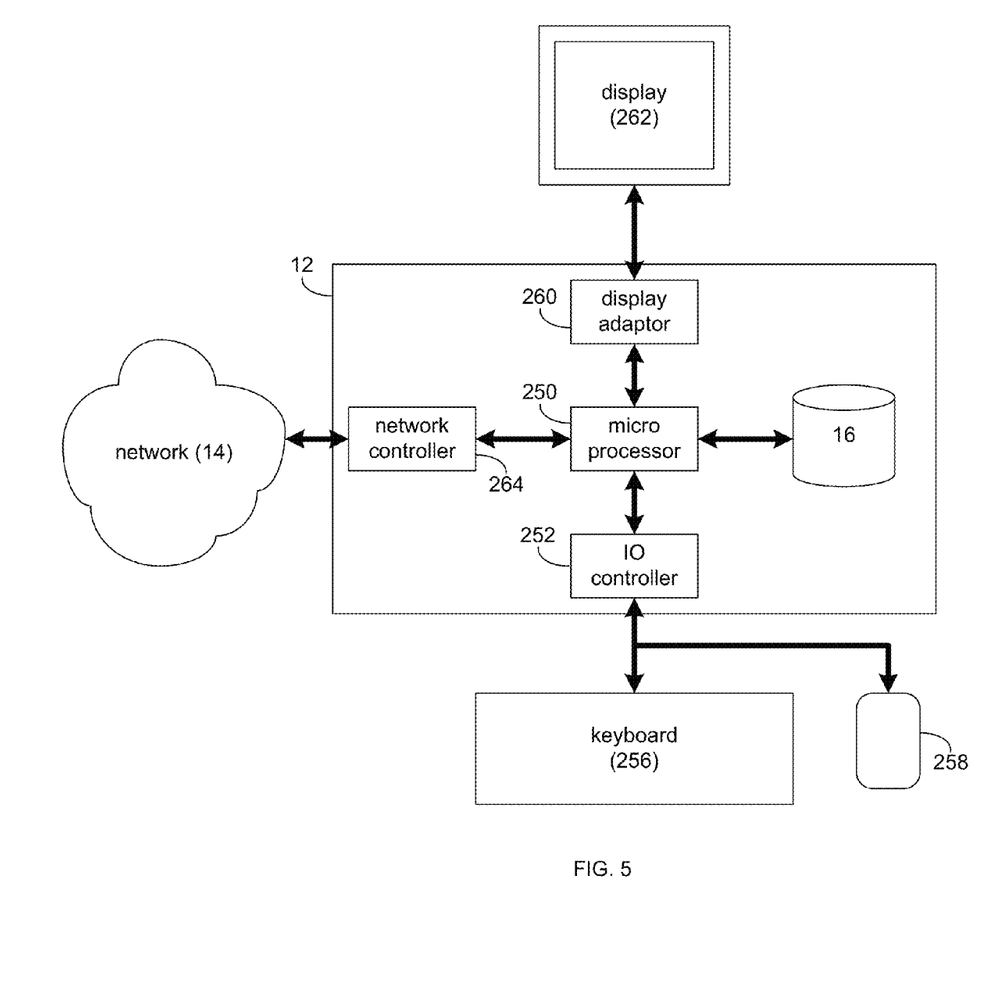
FIG. 5 is a diagrammatic view of the computing device of FIG. 1 according to an embodiment of the present disclosure.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, synchronous communication process 10 may be substituted for computing device 12 within FIG. 5, examples of which may include but are not limited to client electronic devices 28, 30, 32, 34.

Computing system 12 may include microprocessor 250 configured to e.g., process data and execute instructions/code for synchronous communication process 10. Microprocessor 250 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 252 may be configured to couple microprocessor 250 with various devices, such as keyboard 256, mouse 258, USB ports (not shown), and printer ports (not shown). Display adaptor 260 may be configured to couple display 262 (e.g., a CRT or LCD monitor) with microprocessor 250, while network adapter 264 (e.g., an Ethernet adapter) may be configured to couple microprocessor 250 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 250) of a general purpose computer/special purpose computer/other programmable data processing apparatus (e.g., computing device 12), such that the instructions, which execute via the processor (e.g., processor 250) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A non-transitory computer-readable medium with an executable program stored thereon, wherein the program is executable by a processor to perform operations comprising:
   providing, using one or more computing devices, a plurality of users of a social network with an ability to schedule a topic-specific, synchronous communication session to occur at a future time by specifying a specific topic for the communication session, one or more members of a social network group to invite, and a date and time;
   receiving an indication, from a first user of the plurality of users, to schedule the topic-specific, synchronous communication session to occur at the future time, the indication including a proposed topic for the communication session, one or more members of the first user's social network groups to invite, and the date and time;
   providing, using the one or more computing devices, electronic invitations concerning the topic-specific, synchronous communication session to one or more invited users chosen from the plurality of users of the social network, the electronic invitations including the proposed topic for the communication session and the date and time;
   receiving an invitation response notification, from at least one of the invited users, in response to the electronic invitation concerning the topic-specific, synchronous communication session; and
   providing, using the one or more computing devices, the topic-specific, synchronous communication session for the first user and the at least one of the invited users at the date and time by rendering an audio-video stream received from one or more of the first user and the at least one of the invited users within the topic-specific, synchronous communication session.

2. The non-transitory computer-readable medium of claim 1, wherein the operations further comprise:
   allowing the first user to define a text-based comment concerning the topic-specific, synchronous communication session.

3. The non-transitory computer-readable medium of claim 2 wherein the providing electronic invitations concerning the topic-specific, synchronous communication session includes:
   providing the text-based comment to the one or more invited users.

4. The non-transitory computer-readable medium of claim 2, wherein the text-based comment is a descriptor for the topic-specific, synchronous communication session.

5. The non-transitory computer-readable medium of claim 1, wherein the operations further comprise:
   providing, using the one or more computing devices, electronic reminders concerning the topic-specific, synchronous communication session to one or more invited users chosen from the plurality of users of the social network at the future time.

6. The non-transitory computer-readable medium of claim 5, wherein the electronic reminders are chosen from the group consisting of:
   an email notification to an email inbox;
   a sandbar notification to a GUI; and
   a ping notification to a cellphone.

7. The non-transitory computer-readable medium of claim 1, wherein the electronic invitations concerning the topic-specific, synchronous communication session are provided to one or more invited users who have proactively chosen to allow invitations.

8. A computer-implemented method comprising:
   providing, using one or more computing devices, a plurality of users of a social network with an ability to schedule a topic-specific, synchronous communication session to occur at a future time by specifying a specific topic for the communication session, one or more members of a social network group to invite, and a date and time;
   receiving an indication, from a first user of the plurality of users, to schedule the topic-specific, synchronous communication session to occur at the future time, the indication including a proposed topic for the communication session, one or more members of the first user's social network groups to invite, and the date and time; and
   providing, using the one or more computing devices, electronic invitations concerning the topic-specific, synchronous communication session to one or more invited users chosen from the plurality of users of the social network, the electronic invitations including the proposed topic for the communication session and the date and time;
   receiving an invitation response notification, from at least one of the invited users, in response to the electronic invitation concerning the topic-specific, synchronous communication session; and
   providing, using the one or more computing devices, the topic-specific, synchronous communication session for the first user and the at least one of the invited users at the date and time by rendering an audio-video stream received from one or more of the first user and the at least one of the invited users within the topic-specific, synchronous communication session.

9. The computer-implemented method of claim 8 further comprising:
   allowing the first user to define a text-based comment concerning the topic-specific, synchronous communication session.

10. The computer-implemented method of claim 9 wherein providing electronic invitations concerning the topic-specific, synchronous communication session includes:
    providing the text-based comment to the one or more invited users.

11. The computer-implemented method of claim 9 wherein the text-based comment is a descriptor for the topic-specific, synchronous communication session.

12. The computer-implemented method of claim 8 further comprising:
providing, using the one or more computing devices, electronic reminders concerning the topic-specific, synchronous communication session to one or more invited users chosen from the plurality of users of the social network at the future time.

13. The computer-implemented method of claim 12 wherein the electronic reminders are chosen from the group consisting of:
an email notification to an email inbox;
a sandbar notification to a GUI; and
a ping notification to a cellphone.

14. The computer-implemented method of claim 8, wherein the electronic invitations concerning the topic-specific, synchronous communication session are provided to one or more invited users who have proactively chosen to allow invitations.

15. A computing system including a processor and memory configured to perform operations comprising:
providing, using one or more computing devices, a plurality of users of a social network with an ability to schedule a topic-specific, synchronous communication session to occur at a future time by specifying a specific topic for the communication session, one or more members of a social network group to invite, and a date and time;
receiving an indication, from a first user of the plurality of users, to schedule the topic-specific, synchronous communication session to occur at the future time, the indication including a proposed topic for the communication session, one or more members of the first user's social network groups to invite, and the date and time; and
providing, using the one or more computing devices, electronic invitations concerning the topic-specific, synchronous communication session to one or more invited users chosen from the plurality of users of the social network, the electronic invitations including the proposed topic for the communication session and the date and time;
receiving an invitation response notification, from at least one of the invited users, in response to the electronic invitation including the topic-specific, synchronous communication session; and
providing, using the one or more computing devices, the topic-specific, synchronous communication session for the first user and the at least one of the invited users at the date and time by rendering an audio-video stream received from one or more of the first user and the at least one of the invited users within the topic-specific, synchronous communication session.

16. The computing system of claim 15 further configured to perform operations comprising:
allowing the first user to define a text-based comment concerning the topic-specific, synchronous communication session.

17. The computing system of claim 16 wherein the providing electronic invitations concerning the topic-specific, synchronous communication session includes:
providing the text-based comment to the one or more invited users.

18. The computing system of claim 16 wherein the text-based comment is a descriptor for the topic-specific, synchronous communication session.

19. The computing system of claim 15 further configured to perform operations comprising:
providing, using the one or more computing devices, electronic reminders concerning the topic-specific, synchronous communication session to one or more invited users chosen from the plurality of users of the social network at the future time.

20. The computing system of claim 19 wherein the electronic reminders are chosen from the group consisting of:
an email notification to an email inbox;
a sandbar notification to a GUI; and
a ping notification to a cellphone.

21. The computing system of claim 12 wherein the electronic invitations concerning the topic-specific, synchronous communication session are provided to one or more invited users who have proactively chosen to allow invitations.

* * * * *